United States Patent
Assulin et al.

(10) Patent No.: US 10,169,223 B2
(45) Date of Patent: Jan. 1, 2019

(54) IDENTIFYING COMMITS ASSOCIATED WITH FAILED TESTS

(71) Applicant: EntIT Software LLC, Sunnyvale, CA (US)

(72) Inventors: Ohad Assulin, Yehud (IL); Elad Benedict, Yehud (IL); Shaul Strachan, Yehud (IL); Raz Regev, Yehud (IL); Gabi Shalev, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/491,542

(22) Filed: Apr. 19, 2017

(65) Prior Publication Data

US 2018/0307593 A1    Oct. 25, 2018

(51) Int. Cl.
*G06F 9/44*    (2018.01)
*G06F 11/36*    (2006.01)
*G06F 8/71*    (2018.01)

(52) U.S. Cl.
CPC ............ *G06F 11/3692* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 9,292,688 B2 | 3/2016 | Avasarala | |
| 2013/0152047 A1 | 6/2013 | Moorthi | |
| 2016/0034270 A1* | 2/2016 | Swierc | G06F 11/3668 717/126 |
| 2018/0067740 A1* | 3/2018 | Bofferding | G06F 11/3692 |

OTHER PUBLICATIONS

Brun, Y. et al.; Finding Latent Code Errors via Machine Learning Over Program Executions; https://homes.cs.washington.edu/~mernst/pubs/machlearn-errors-icse2004.pdf; May 23-28, 2004; 11 pages.

Mathur, R. et al; Adaptive Automation: Leveraging Machine Learning to Support Uninterrupted Automated Testing of Software Applications; https://arxiv.org/pdf/1508.00671.pdf; Aug. 4, 2015; 6 pages.

\* cited by examiner

*Primary Examiner* — Qamrun Nahar

(57) ABSTRACT

Techniques for identifying a build commit that caused a test failure are provided. A build which includes a failed test may be identified. For each commit in the build a weighting factor may be calculated for files that have been previously associated with the failed test. The weighting factor may be based on the number of times the file has been associated with the failed test and the total number of tests. A weighting factor may also be calculated for files that have not been previously associated with the failed test based on the number of times the file appears with other files that are associated with the failed test. The weighting factors may be added to create a score for the commit. The scores for the commits in the build may be ordered. The higher the score, the more likely the commit was the cause of the failed test.

20 Claims, 7 Drawing Sheets

| Build Number | Commits | Failed Tests |
|---|---|---|
| 1 | 101, 103, 105, 107, 109 | None |
| 2 | 111, 112, 113 | Test TTT |
| 3 | 120 | None |
| 4 | 130, 131 | None |
| 5 | 150, 151 | Test TTT, Test MMM |
| 6 | 170, 171, 172 | None |

| #   | Name   | Team   | Message              | Files                |
|-----|--------|--------|----------------------|----------------------|
| 101 | Bob    | Red    | Feature Zed          | a.java               |
| 103 | Sally  | Blue   | Feature Alpha        | b.java               |
| 105 | John   | Blue   | Feature Alpha        | c.java               |
| 107 | Andrea | Yellow | Feature Beta         | d.java               |
| 109 | Dave   | Yellow | Feature Gamma        | e.java               |
| 111 | Sally  | Blue   | Feature Epsilon      | a.java, b.java, c.java |
| 112 | John   | Blue   | Feature Alpha        | a.java               |
| 113 | Dave   | Yellow | Feature Gamma        | b.java               |
| 120 | Dave   | Yellow | Fix                  | a.java               |
| 130 | Bob    | Red    | Feature #152         | d.java               |
| 131 | Sally  | Blue   | Feature #152         | e.java               |
| 150 | Bob    | Red    | Code                 | d.java               |
| 151 | Dave   | Yellow | Code for sort feature | c.java              |
| 170 | Bob    | Red    | Code                 | f.java               |
| 171 | Andrea | Yellow | Code submission      | c.java               |
| 172 | Sally  | Blue   | Code for sort feature:fix | d.java          |

FIG. 3

| File   | Count |
|--------|-------|
| a.java | 10    |
| b.java | 7     |
| c.java | 9     |
| d.java | 2     |
| e.java | 3     |
| f.java | 8     |

FIG. 4

| File 1 | File 2 | Count |
|--------|--------|-------|
| a.java | b.java | 4 |
| a.java | c.java | 6 |
| a.java | d.java | 3 |
| a.java | e.java | 0 |
| a.java | f.java | 2 |
| b.java | c.java | 0 |
| b.java | d.java | 0 |
| b.java | e.java | 0 |
| b.java | f.java | 6 |
| c.java | d.java | 5 |
| c.java | e.java | 3 |
| c.java | f.java | 4 |
| d.java | e.java | 0 |
| d.java | f.java | 3 |
| e.java | f.java | 2 |

FIG. 5

| Test Name | File | Count |
|-----------|--------|-------|
| Test TTT | a.java | 5 |
| | b.java | 3 |
| | d.java | 1 |
| | | |
| Test MMM | b.java | 3 |
| | e.java | 2 |

| Build Number | Commits | Failed Tests |
|---|---|---|
| 7 | 201, 301, 401 | Test TTT |

720

| # | Name | Team | Message | Files |
|---|---|---|---|---|
| 201 | Bob | Red | Feature Zed | a.java, b.java, c.java |
| 301 | Sally | Blue | Feature Alpha | c.java |
| 401 | John | Blue | Feature Alpha | e.java |

730 a.java

TF = f / maxfile = 5/5
IDF = log(TESTS/Tests$_{file}$) = 6/1
TF*IDF = .778 b.java

TF = f / maxfile = 3/5
IDF = log(TESTS/Tests$_{file}$) = 6/2
TF*IDF = .286 c.java dice (a,c) = 2* f(a,c)/(f(a) +f(c)) = 2*6 / (10+9) = .631 dice (b,c) = 2* f(b,c)/(f(b) +f(c)) = 2*0 / (7+9) = 0 dice (d,c) = 2* f(d,c)/(f(d) +f(c)) = 2*5 / (2+9) = .909

Max(dice) = .909

Commit 201 Score = .778 + .286 + .909 = 1.973

740

Commit 301 Score = .909

750

Commit 401 Score = 0

FIG. 7

IDENTIFYING COMMITS ASSOCIATED WITH FAILED TESTS

BACKGROUND

In software development, the codebase is the set of source code files from which the end product is created. The process of creating the end product, which can also be referred to as building the end product or a build, may vary based on the type of codebase. For example, the end product may be created by compiling and linking the source code files or by arranging and packaging the files into a package that is later executed by an interpreter. What should be understood is that the functionality of the end product is defined by the code base.

When changes to the end product are needed (e.g. new features, bug fixes, etc.), software developers make changes to the files of the codebase. In many cases, the software developer will group all the desired changes for submission to the code base in what is called a commit. The codebase may pick up the commit and include the changes the developer made in the next build of the end product.

BRIEF DESCRIPTION OF THE DRAWINGS

FIG. 3 is an example of commit related data that may be stored and utilized by the techniques described herein.

FIG. 4 is an example of the file usage data maintained by the training model utilizing the techniques described herein.

FIG. 5 is an example of the pairwise file data maintained by the training model utilizing the techniques described herein.

FIG. 6 is an example of the test associated data maintained by the training model utilizing the techniques described herein.

FIG. 7 is an example of using the model training data from FIGS. 2-6 to identify commit associated with failed tests according to the techniques described herein.

DETAILED DESCRIPTION

Figures 1, 2:
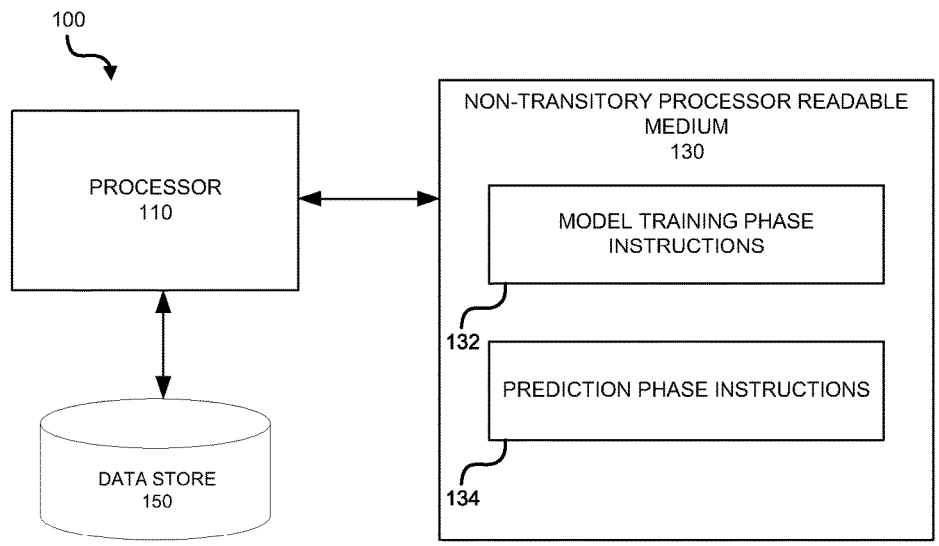
FIG. 1 is an example of a system that may utilize the identifying commits associated with failed tests techniques described herein.
FIG. 2 is an example of build related data that may be stored and utilized by the techniques described herein.

The end product may be periodically built by including all of the commits submitted by developers working on the codebase. The created end product may initially go through some regression tests to ensure that the newly submitted commits did not introduce error, often referred to as bugs, to the code base. There may be a suite of tests, called regression tests, that may be executed to ensure that the existing functionality of the end product has not been broken.

In some cases, the regression tests may be fully automated and do not require the input of human testers. In other cases, the tests may be manual, or a combination of manual and automatic tests. Should one of the regression tests fail, that indicates that functionality that was previously working has been broken. Given the complexity of current software, there may be the possibility that something in a developer commit introduced the error.

Each build may contain any number of commits. Each commit has the potentially for being the cause of the failed test(s). Determining the specific commit that caused a particular test to fail may be a very difficult task requiring large amounts of developer/tester time that may be better utilized on other tasks. Once the source of the error has been determined, an additional commit may be submitted to fix the error.

The techniques described herein provide a mechanism to automate the process of determining which commit may have caused a test failure. As mentioned above, a pattern may exist where an error is introduced with one commit, and is later fixed in a second commit. The techniques described herein utilize this relationship to create a model and then use the model to determine commits that cause test failures.

The techniques described herein generally have two phases. In the first phase, a model is created based on historical build data. This historical data is analyzed to identify pairs of commits that may be related as part of a test error/test fix pair. The pairs of commits are identified using heuristics that are described in further detail below. For each failed test, the files included in the identified pair of commits are logged as associated with the failed test. In addition, a count of the number of times each file appears in any commit is maintained. Finally, a pairwise count of the number of times a file appears in a commit with all other files is maintained.

In the second phase, the model that was created in the first phase is used to aid in the identification of commits that cause test failures. A score is calculated for each commit in a build that includes a test failure. The score for the commit is determined based on the model. A portion of the score is determined by how often failure of the particular test is associated with each file appearing in the commit. Another portion of the score is determined by how often each file in the commit appears with other files that are associated with failures of the test, even though the file itself is not associated with the failure of the test. The scores for each commit may be ordered. Commits with higher scores may be more likely to be the source of the failed test. Although this result is not guaranteed to be correct, it will at least allow developers to begin their search for a fix of the failed test with the commits that are most likely to have caused the failure. These techniques are described in further detail below and in conjunction with the appended figures.

FIG. 1 is an example of a system that may utilize the identifying commits associated with failed tests techniques described herein. System 100 may include a processor 110, a non-transitory processor readable medium 130 containing processor executable instructions thereon, and a data store 150. The processor may be any type of device that is capable of executing instructions in order to implement the techniques described herein. For example, the processor may be a central processing unit (CPU), a graphics processing unit (GPU), an application specific integrated circuit (ASIC) or any other device capable of executing instructions stored on a processor readable medium.

The non-transitory processor readable medium 130 may include a set of processor executable instructions thereon. These instructions may be executed by the processor to implement the techniques described herein. For example, the medium may include model training phase instructions 132 to create a model from build data. The model may be used in later predictions of which commit caused a test to fail. The operation of model training phase instructions 132 are described below and in the flow diagrams and in the remaining figures. For example, the model training phase flow diagrams depicted in FIGS. 8 and 9 may be an implementation of model training phase instructions.

The non-transitory medium 130 may also include prediction phase instructions 134. The operation of the prediction phase instructions are described below and in the flow diagram depicted in FIG. 10.

The system 100 may also include a data store 150. The particular form of the data store is relatively unimportant. For example, the data store may be a database. The data store may be a relational database, and object database, a key-value store, or any other mechanism for data storage. The data store may be a file based data store. The data store may be a block based data store. What should be understood is that any device capable of storing data is suitable for use with system 100.

The data store 150 may store the codebase of the software product that is utilizing the commit identification techniques described herein. For example, the data store may store all of the source files of the software product. The data store may also store build data, which may include information about previous builds and the results of any regression testing performed on those builds. The data store may also include information related to the commits that were submitted by developers. The data store may also store data related to the files that were included in the commits as well as the relationships those files have with other files as well as with failed tests. Examples of the data are presented in the next figures to aid in description of the techniques described herein.

Furthermore, it should be understood that the example implementation of system 100 as processor based is just an example. The techniques described herein are not limited to processor based systems that execute instructions. The techniques described herein are equally applicable to systems created using discrete logic and hard coded circuitry. For example, the logic may be embodied in the form of an application specific integrated circuit (ASIC), as a field programmable gate array (FPGA), a programmable logic device (PLD), or any other form of logic circuitry.

FIG. 2 is an example of build related data that may be stored in data store 150 and utilized by the techniques described herein. In this example, there have been a total of 6 builds of the software product. The builds occurred sequentially, with each build occurring after the previous build. Each build may include an identification of the commits that were included in the build. The build data may also include an indication of any regression tests that failed to execute properly for the build. As mentioned above, a failed test may indicate that something in a commit introduced an error into the codebase.

In the present example, we see that build 1 includes 5 commits with identifiers 101, 103, 105, 107 and 109. It should be understood that the commit identifiers are merely examples to allow each particular commit, and the files and associated data for that commit to be identified. There were no failed tests after build 1 was tested. Build 2 includes 3 commits, with identifiers 111, 112, 113. There was one test, with the name "Test TTT" that failed when build 2 was tested. It is a very likely possibility that one of the files in the commits 111, 112, or 113 was responsible for causing the test failure, as those would have been the only changes to the codebase since build 1, which had no failures.

Build 3 may have 1 commit, identified as commit 120. Build 3 may have no test failures. As such, it is likely that the codebase change made in commit 120 may have repaired the codebase change that caused the error in build 2. However, it should be understood that the techniques described herein are not dependent on such an easy identification of a commit that fixes a failing test. The techniques described herein are statistical in nature and can be applied even in cases where it is not as easy to determine the relationship between a failed test and the commit that fixed the failure.

Build 4 may have 2 commits, identified as 130, 131 and no test failures. Build 5 may have 2 commits 150, 151, and no failures. Build 6 may have 3 commits, 170, 171, 172 and 2 failed tests. The failing test names may be "Test TTT" and "Test MMM."

FIG. 3 is an example of commit related data that may be stored and utilized by the techniques described herein. As described with respect to FIG. 2 each build may include certain commits. FIG. 3 depicts an example of some of the information that may be associated with commits. This commit data may be stored in data store 150.

The commit related data may include a commit identifier, which in this example is noted by the column "#" and is shown as a numeric value. However, it should be understood that this is merely for purpose of description. The techniques described herein are suitable for use with any type of identifier that can individually identify a commit.

The commit related data may also include a committer name, as indicated by the "name" column. The committer name may be the name of the developer that is submitting the commit. Likewise, the commit related data may include a committer team, as indicated by the "Team" column, which in this example lists Red, Blue, and Yellow teams. Software developers are often organized into teams to work on related features. Thus, it may be possible that persons working on the same feature are working on the same areas of functionality in the codebase.

The commit related data may also include what may be referred to as a commit message, as designated by the "message" column. A commit message may be a line of descriptive text that is associated with the contents of the commit. For example, the commit message might recite a particular feature that is associated with a commit. The commit message may also indicate that a particular commit is associated with a bug fix for a feature. The techniques described herein are not limited to any particular content in a commit message. Finally, the commit related data may include the particular files that were part of the commit (i.e. the files modified by that particular commit) as denoted by the "Files" column.

It should be understood that the particular fields of commit related data that are described are only for purposes of explanation. The techniques described herein are not dependent on any particular fields being present. The commit data need only include some way of identifying commits, an indication of which files are included in the commit, and data for relating the commits to each other via a heuristic of some type. Various types of heuristic will be described below.

FIG. 4 is an example of the file usage data maintained by the training model utilizing the techniques described herein. The training model includes a table that keeps track of the number of times a file appears in any given commit. Because a file cannot appear in a single commit more than once, the numeric range for the number of appearances ranges from 0 (i.e. file is not included in any commit) to the total number of commits (i.e. file is included in every commit). Use of this data is described in further detail below. Although specific file names and counts are used, it should be understood that this is not intended to reflect actual data but is being used for purposes of explanation.

FIG. 5 is an example of the pairwise file data maintained by the training model utilizing the techniques described herein. The training model includes a table that keeps track of the number of times each file appears with any other file in the same commit. For example, if the files a.java and b.java are included in the same commit (e.g. commit 111 shown in FIG. 3) then the count for the combination a.java and b.java will be incremented by 1. Use of this data is described in further detail below. Although specific file names and counts are used, it should be understood that this is not intended to reflect actual data but is being used for purposes of explanation.

FIG. 6 is an example of the test associated data maintained by the training model utilizing the techniques described herein. For each regression test that can be executed on the product, the training model maintains a table that include a count on the files that are associated with commits that may have caused the test to fail or may have provided a fix to the failing test. As a simple example, consider the trivial case in which a build includes one commit, containing two files, a.java and b.java, that causes "Test TTT" to fail. The very next build may also include a single commit, which includes the file a.java, and includes no failed tests. Presumably these two commits are related, at minimum by virtue of the heuristic that they contain at least one file in common. So, the training model may identify the two commits as a pair, due to the heuristic that there is file commonality between the commits. As such, in an entry associated with "Test TTT" all files that were included in either commit are associated with failing "Test TTT." In this example, the entry associated with "Test TTT" would include an indication that file a.java and b.java were present, and their count would be 1 each.

For purposes of explanation, assume a second set of builds occurred. In the second set, a first build may include a commit that included file a.java and caused "Test TTT" to fail. A second build may have included a commit containing files a.java and c.java, and did not cause a failure on "Test TTT." Given the heuristic that file commonality is a mechanism for identifying pairs of commits, the counts of the record associated with "Test TTT" may be modified. First, the file a.java may have its count incremented, because this is the second time that the file a.java has appeared in a pair of commits that was associated with a failure of "Test TTT." File c.java may then also be associated with the failing "Test TTT" and its count set to 1, because this is the first time it has appeared.

File commonality has is one heuristic that may be used to identify pairs of commits that are associated with an introduction of an error in one commit and a correction of that error in a second commit. Other heuristics may be used as well. For example, the committer name may be used to identify pairs of commits. For example, if a commit was submitted by committer "Bob" caused a "Test MMM" to fail in a given build and a later build also contained a commit by "Bob" that did not cause the same test failure, the two commits may be considered to be a pair. "Test MMM" may then be associated with all the files that are included in the two commits. Yet another heuristic that may be used is the committers team. Just as the above example of committer "Bob" causes identification of a pair of commits, a similar heuristic involving the committers team may also be used.

Yet another heuristic that may be used could be the area of the product that the test covers. Assume that "Test TTT" covers some defined functionality, commits that include files associated with that functionality could be considered related. Another example of a heuristic that may be used is the area of the product that is related to the commit. Another example of heuristic that may be used are commonality of the commit message. Consider a commit message that says "Code submission for feature Alpha" and another commit that has a commit message that says "Bug Fix:Code submission for feature Alpha." These two commits should likely be identified as a pair. Existing string commonality algorithms may be used to identify similarity in commit messages. Other examples of heuristics that may be used may include files extensions, file extensions of the test file, file extensions of the committed files, or any other mechanism that may be used to identify pairs of commits.

The previous description focused on use of a single heuristic to identify pairs of commits. However, it should be understood that combinations of heuristics may be used as well. For example a heuristic for identifying two commits as belonging to a pair may include same committer name plus greater than 50% file commonality. Another example may be same committer team with 90% similarity in the commit message. The techniques described herein are not limited to any specific heuristic or combination of heuristics for identifying pairs of commits.

In operation, the system 100 will periodically update the training model by examining the build data. The system will update the counts of files included in commits and the pairwise presence of files as described in FIGS. 4 and 5. It should be understood that system 100 need not start from the beginning of the build sequences when updating file counts. Instead, the system can update the file counts by examining only the builds that have occurred since the last update of the training model.

Likewise, the system 100 can update the failing test data as shown in FIG. 6. By examining the build data, the system can identify sequences of builds that cause a test to fail and a subsequent build that causes the test to pass. Once these builds have been identified, pairs of commits can be identified by using the heuristics that are described above. Once those pairs of commits are identified, the files included in those commits can be associated with the failing test, with a count maintained for the number of pairs of commits that were associated with that file.

The data depicted in FIGS. 2-6 are intended for purposes of description only. The actual numbers, file names, build data, and commit data are not intended to depict an actual implementation, but rather are for purposes of description.

The preceding description described the model training phase of the techniques described herein. The model training phase occurs periodically. For example, the model training phase can occur upon completion of every build, every defined number of builds, every hour, every day, every week, or any other period. What should be understood is that as additional build and failing test data is obtained, the model is updated to incorporate that new information.

Once a model is available, the model may be used in a prediction phase. When a new build is completed and one or more regression tests in that build failed, it is often desirable to determine which commit was the one that caused the test to fail. At minimum, this information may be used to let the commit submitter know that their submission was defective and corrective action needs to be taken.

The techniques described herein provide for a prediction phase that utilizes the training model described above. A new build may compete, and that build may fail one or more regression tests. The build may include one or more commits. For each commit, a score may be calculated. The score may determine the likelihood that the specific commit was the source of the failed test. The score is based on the training model that was previously described.

The score assigned to each commit is based on the files included in the commit. Each file in the commit that has been previously associated with the failing test is given a weighting factor. For example, assume a build is completed and test TTT failed. As shown in FIG. 6, Test TTT has been previously associated with files a.java, b.java, and d.java. A weighting factor may be assigned to each commit that includes one of the files that has been previously associated with the failing test.

The weighting factor may be based on a term frequency—inverse document frequency (TF-IDF) metric. In general in a TF-IDF metric, the term frequency (TF) portion is calculated first. The IDF portion may then be calculated. The TF and IDF portions may then be multiplied to calculate the TF-IDF metric, which may then be used as the weighting factor.

Although techniques described herein are not limited to any specific TF function, one implementation may use a double normalization K scheme. Such a scheme is governed by the following equation:

$$TF=K+(1-K)f/\max_{file} \qquad (eq.\ 1)$$

where K is a constant that ranges from 0-1, f is a count of the number of times the file has been previously associated with the failed test, as retrieved from the table similar to the one depicted in FIG. 6, and $\max_{file}$ is a count of the file with highest number of previous associations with the failed test. In some implementations K may be set to the value of 0. As should be understood, the TF value indicates how often the particular file is associated with the test failing in relation to the file that has been associated with the test failing the largest number of times.

The techniques described herein are also not limited to any specific form of IDF function. However, one implementation may use a log based inverse document frequency scheme. Such a scheme is governed by the following equation:

$$IDF=\log(TESTS/Tests_{file}) \qquad (eq.\ 2)$$

where TESTS is the total number of tests possible, and $Tests_{file}$ is the total number of tests that have been previously associated with this file. What should be clear is that as a file is associated with more and more tests, the IDF value is reduced (due to the log function) because the file becomes less valuable in predicting the commit that caused the test failure. At the limit, if a file is associated with every possible test, then the IDF value would be 0, as the file would provide no predictive value.

Once the TF and IDF functions have been calculated for a file, the two values are multiplied. This process is repeated for every file in the commit that is being assigned a score. A running total of the values calculated thus far is maintained.

As mentioned above, the TF-IDF value is calculated for each file that was included in the commit. This covers the case where a test failure and a file have a direct relationship (e.g. something included in the file caused the test to fail). However, there is another class of failure wherein the file included on in the commit has an indirect relationship with failed test. For example, consider a case where the failed test is associated with file a.java only. Assume that the commit only contains file c.java. However, assume that based on the pairwise file data (e.g. the type of data maintained in FIG. 5) file a.java and c.java appear together very often in commits. Thus, even though the file a.java does not appear in the commit, the presence of the file c.java may indicate a relationship with the failed test.

To compute a metric for files that are included in a commit, but are not directly associated with a failed test, a dice metric may be used. The dice metric may be governed by the following equation:

$$dice(f_1,f_2)=(2*\mathrm{freq}(f_1,f_2))/(\mathrm{freq}(f_1)+\mathrm{freq}(f_2)) \qquad (eq.\ 2)$$

where $\mathrm{freq}(f_1,f_2)$ is the number of times the file in question appears with one of the files that has been previously associated with the failing test (i.e. the data maintained as shown in FIG. 5), and $\mathrm{freq}(f_x)$ is the number of times the file appears across all commits (i.e. the data maintained as shown in FIG. 4). It should be understood that for each file in a commit that has not been previously associated with a failed test, that there will be multiple dice metrics calculated, with one for each file that has been previously associated with the failed test. The maximum value of the calculated dice metrics may be associated with the file that appears in the commit but has not been previously associated with the failed test.

The prediction phase may be better understood by way of example. For purposes of this example, assume that the numerical values contained in tables 2-6 represent actual data from a model that has been previously trained. The example will be described below.

FIG. 7 is an example of using the model training data from FIGS. 2-6 to identify commit associated with failed tests according to the techniques described herein. For purposes of this description, assume that a new build build-7 720, has completed, and "Test TTT" has failed. The new build includes 3 commits, commit 201, 301, and 401. Commit 201 includes files a.java, b.java, and c.java, commit 301 includes files c.java, and commit 401 includes file e.java, as shown in element 720.

Because "Test TTT" has failed, we refer to the model data for the files associated with "Test TTT" as shown in FIG. 6. As shown, Test TTT is associated with three files (counts of previous association with failed test TTT), a.java (5), b.java (3) and c.java(1). The process then proceeds to compute a metric for each of the commits that were included in build 7.

The first commit is commit 201. As shown at element 730, commit 201 includes files a.java, b.java, and c.java. For each of these files, a weighting factor will be determined. For the file a.java, we can see that file a.java has been associated with failed "Test TTT" 5 times. We also see that file a.java is the file that has been associated with the failing test TTT the greatest number of times. Using eq.1 and eq. 2, we can calculate the TF-IDF function for commit 201, file a.java. Note, for purposes of this description, it will be assumed that K=0. Also, for purposes of this description it will be assumed that the total number of tests in the system is 6. The resulting TF-IDF value is 0.778.

The same calculation can be made for file b.java. Here, from FIG. 6, we see that file b.java has been associated with failing test TTT 3 times, and that the maximum number of times any file has been associated with failing test TTT is file a.java at 5 times. Thus, the TF function is 3/5. Given the assumption that there are 6 total tests, the table shown in FIG. 6 indicates that the file b.java is associated with 2 tests (Test TTT and Test MMM). Thus, the calculation shown for the IDF function is log (6/2). The resultant TF-IDF value is 0.286.

File c.java is not associated with failing test TTT, and as such, there is no direct relationship. However, there may be an indirect relations as will be computed by the dice metric. The computation of the dice value for the files follows equation 3. As shown, file c.java is not associated with failing test. What is calculated is the dice value for the appearance of file c.java with each file that is associated with the failing test TTT. As shown, the dice value for (a.java, c.java), (b.java, c.java) and (d.java, c.java) will be calculated according to equation 3 and the data shown in FIGS. 4 and 5. The maximum value of this calculation(0.909) is selected and this weighting factor is associated with file c.java. The weighting factors for all files in commit 201 are then added to arrive at a score of 1.973 that is then assigned to commit 201.

A similar process happens for commit 301. Here, we see that commit 301 only includes file c.java. As should be clear for the description above, file c.java is not associated with test TTT. As such, the dice metric may be calculated. The dice metric calculation for file c.java in commit 301 is the same that of the dice metric computed for commit 201 (i.e. 0.909) and the description will not be repeated here. Because there are no other files associated with commit 301, the score of 0.909 is assigned to commit 301 as shown in element 740.

Element 750 depicts the computation of the score for commit 401. Commit 401 includes only file e.java. As shown in FIG. 6, file e.java has not been previously associated with failing test TTT, and as such, no TF-IDF weighting can be computed. Likewise, based on the table shown in FIG. 5, file e.java does not appear with any other file that has been previously associated with failing test TTT (e.g. file e.java never appears in any commit with any of files a.java, b.java, or d.java). As such, the dice computation for file e.java and test TTT is 0. The resulting score of commit 401 is thus 0.

The scores assigned to each commit may then be ordered. In the present example, commit 201 has the highest score and is thus ordered first. Commit 301 has the second highest score and may be ranked second. Commit 401 has the lowest score and may be ranked last. Because a higher score indicates a greater probability that a commit is associated with a test failure, a developer may wish to examine commit 201 as the source of the failure of test TTT first. If it turns out that commit 201 was not the cause of the test failure, the developer may move to the next lower ordered commit. Although the techniques described herein are not guaranteed to always identify the commit that caused a particular test to fail, they do at least point the developer to the most likely culprit, thus relieving the developer of the need to randomly guess which commit caused the test to fail.

Figure 8:
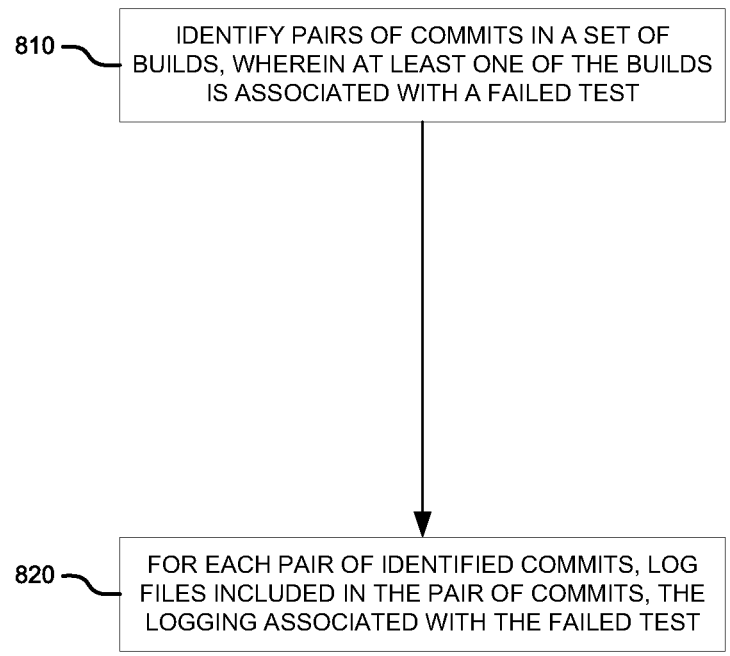
FIG. 8 is an example of a high level flow diagram for training a model according to the identifying commits associated with failed tests techniques described herein.

FIG. 8 is an example of a high level flow diagram for training a model according to the identifying commits associated with failed tests techniques described herein. In block 810 pairs of commits in a set of builds may be identified. At least one of the builds may be associated with a failed test. As described above, during the training phase, build data is examined to build a model. That model may be used later in a prediction process that may be used to help identify commits that caused a test to fail.

In block 820, for each pair of commits that are identified, the files included in the pair of commits may be logged. The logging may be associated with the failed test. As explained above, for each failed test, a list of files that may be associated with the test is maintained. The files may be identified by the files that are included in commits that were determined to be related and also related to the failed test.

Figure 9:
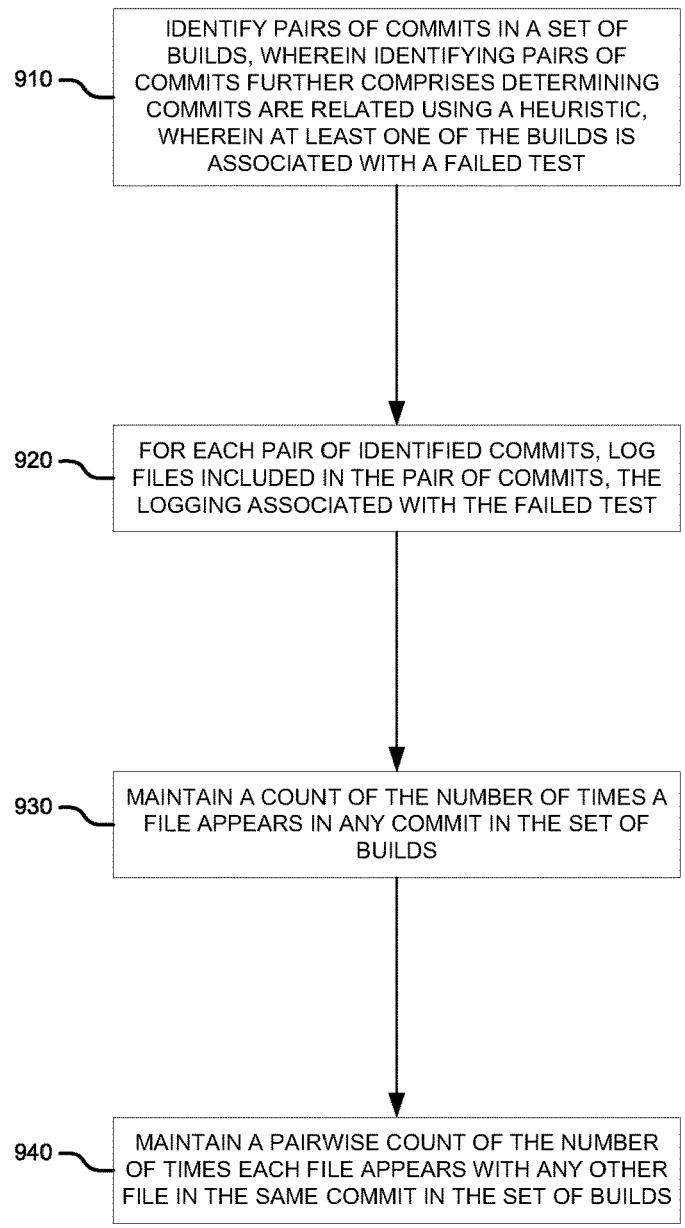
FIG. 9 is another example of a high level flow diagram for training a model according to the identifying commits associated with failed tests techniques described herein.

FIG. 9 is another example of a high level flow diagram for training a model according to the identifying commits associated with failed tests techniques described herein. In block 910, just as in block 810, pairs of commits may be identified. The files included in the pairs of commits and associated with a failing test may be logged.

Identifying pairs of commits may further comprise determining commits that are related using a heuristic. As explained above, any number of heuristics may be used. For example, commonality of committer, file commonality between commits, commonality of the commit message, or any number of other heuristics, such as those mentioned above. In some implementations, the heuristic may be a combination of heuristics. For example, a combined heuristic may be commits form the same committer that have at least 50% file commonality. The techniques described herein are not limited to any particular type or combination of heuristics.

In block 920, just as in block 820, for each identified pair of commits, the files contained in the pair of commits may be logged. The log may be associated with the failed test.

In block 930 a count of the number of times a file appears in any commit in the set of builds may be maintained. As explained above, the total number of times a file is included in any build may be used as part of the dice algorithm that may be used to weight files that are not directly associated with the failed test.

In block 940 a pairwise count of the number of time each file appears with any other file in the same commit in the set of builds may be maintained. As described above, a file may have an indirect relationship with a failed test. Thus, even though the file may itself not directly appear in a commit, it may often appear with other files which themselves may be associated with failed tests.

Figure 10:
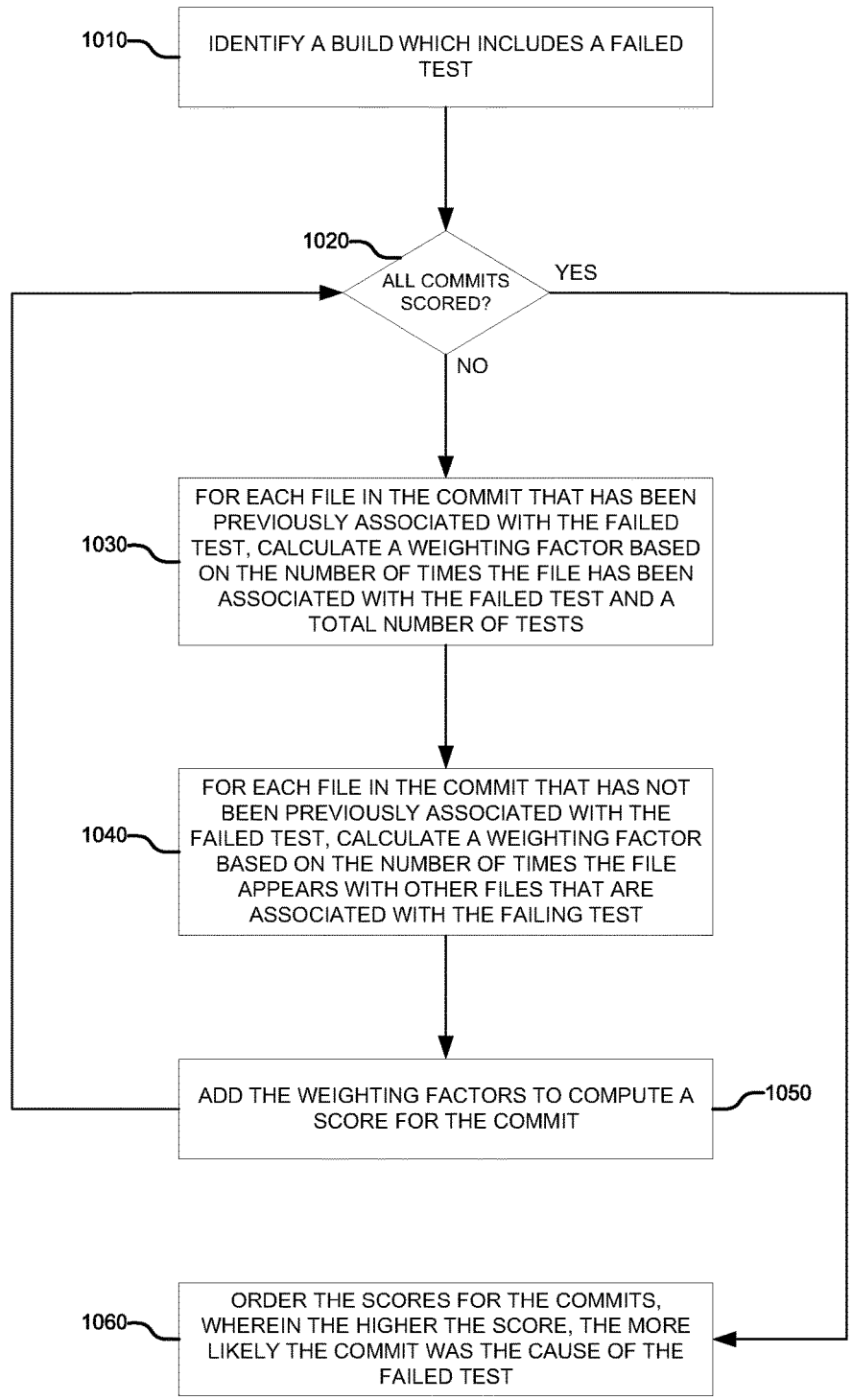
FIG. 10 is an example of a high level flow diagram of using a trained model to identify commits associated with failed tests based on the techniques described herein.

FIG. 10 is an example of a high level flow diagram of using a trained model to identify commits associated with failed tests based on the techniques described herein. In block 1010, a build which includes a failed test may be identified. For example, this could be a build that may contain numerous commits. One of those commits may have been the one that caused a test to fail. The techniques described herein aid in identifying the commit that caused the test to fail.

In block 1020, it may be determined if all commits have been assigned a score. As described above, a score is computed for the files included in each commit. This score may be used to identify the commit that cause the test to fail. If there are no more commits to assign a score, the process moves to block 1060. If there are still commits that have not been assigned a score, the process moves to block 1030.

In block 1030, for each file in the commit that has been previously associated with the failed test, a weighting factor may be calculated. The weighting factor may be based on the number of times the file has been associated with the failed test and a total number of tests. As explained above, in one implementation, the weighting factor may be based on a TF-IDF metric. In some implementations, the TF part of the metric may be based on a double normalization K scheme. In some implementation, the IDF part of the metric may be based on a log based inverse document frequency scheme. Although a specific mechanism for computing the weighting for files appearing in the commit that are also associated with the failed test has been described, it should be understood that the techniques described herein are not limited to the specific mechanism described.

In block 1040, for each file in the commit that has not been previously associated with the failed test, a weighting factor may be calculated. The weighting factor may be based on the number of times the file appears with other files that are associated with the failing test. As mentioned above, there can be an indirect relationship with a test failure and a file such that even though a particular file may not be directly associated with a failed test, it may be associated with another file that is associated with the failed test. Depending on how strong the correlation is, the file may still be implicated in causing the test to fail.

In block 1050 the waiting factors computed for in block 1030 and 1040 may be added. The result of the computation may be assigned to the commit as a score for the commit. The process then returns to block 1020 to determine if there are more commits to process.

Once all commits have been scored, the process moves to block 1060. In block 1060, the scores for the commits are ordered. The higher the score of the commit, the more likely the commit was the cause of the failed test.

We claim:

1. A method comprising:
   identifying pairs of commits in a set of builds, wherein at least one of the builds is associated with a failed test;
   for each commit in the at least one build associated with the failed test:
      for each file in the commit that was previously associated with the failed test, calculating, by a processor, a weighting factor based on a total number of times the file has been associated with the failed test;
      for each file in the commit that was not previously associated with the failed test, calculating, by the processor, a weighting factor based on a total number of times the file appears with other files that are associated with the failed test; and
      adding, by the processor, the weighting factors to compute a score for the commit, wherein the score is for ranking and ordering the commit; and
   for each of the identified pairs of commits, logging files included in the pair of commits, the logging associated with the failed test.

2. The method of claim 1 further comprising:
   maintaining a count of the number of times a file appears in any commit in the set of builds.

3. The method of claim 2 further comprising:
   maintaining a pairwise count of the number of times each file appears with any other file in the same commit in the set of builds.

4. The method of claim 1 wherein identifying pairs of commits further comprises:
   determining commits are related by using a heuristic.

5. The method of claim 4 wherein the heuristic is file commonality between the pair of commits.

6. The method of claim 4 wherein the heuristic is committer commonality between the pair of commits.

7. The method of claim 4 wherein the heuristic is a commit message associated with the pair of commits.

8. The method of claim 4 wherein the heuristic is a combination of heuristics.

9. A method comprising:
   identifying, by a processor of a computing device, a build which includes a failed test;
   for each of a plurality of commits in the build:
      for each file in the commit that has been previously associated with the failed test, calculating, by the processor, a weighting factor based on a total number of times the file has been associated with the failed test and a total number of tests;
      for each file in the commit that has not been previously associated with the failed test, calculating, by the processor, a weighting factor based on a total number of times the file appears with other files that are associated with the failed test; and
      adding, by the processor, the weighting factors to compute a score for the commit; and
   ordering, by the processor, the commits based on the scores for the commits, wherein the higher the score, the more likely the commit was the cause of the failed test.

10. The method of claim 9 wherein the weighting factor based on the number of times the file has been associated with the failed test is calculated using a term frequency—inverse document frequency (TF-IDF) statistic.

11. The method of claim 10 wherein the term frequency (TF) is calculated using a double normalization scheme.

12. The method of claim 10 wherein the inverse document frequency is calculated using a log based inverse document frequency scheme.

13. The method of claim 9 wherein the weighting factor based on the number of times the file appears with other files that are associated with the failed test is based on a table containing the number of times there is an association.

14. The method of claim 13 further comprising using a dice measure to calculate the weight.

15. A non-transitory processor readable medium containing thereon a set of instructions that when executed by a processor cause the processor to:
   identify a build which includes a failed test;
   for each of a plurality of commits in the build:
      for each file in the commit that has been previously associated with the failed test, calculate a weighting factor based on a total number of times the file has been associated with the failed test and a total number of tests;
      for each file in the commit that has not been previously associated with the failed test, calculate a weighting factor based on a total number of times the file appears with other files that are associated with the failed test; and
      add the weighting factors to compute a score for the commit; and
   order the commits based on the scores for the commits, wherein the higher the score, the more likely the commit was the cause of the failed test.

16. The medium of claim 15 further comprising instructions to:
   identify pairs of commits in a set of builds, wherein at least one of the builds is associated with the failed test; and
   for each of the identified pairs of commits, log files included in the pair of commits, the logging associated with the failed test.

17. The medium of claim 16 further comprising instructions to:
   maintain a count of the number of times a file appears in any commit in the set of builds; and
   maintain a pairwise count of the number of times each file appears with any other file in the same commit in the set of builds.

18. The medium of claim 15, wherein the instructions to calculate a weighting factor based on the total number of times the file has been associated with the failed test and a total number of tests further comprises instructions to:
calculate a term frequency—inverse document frequency (TF-IDF) statistic.

19. The medium of claim 15, wherein the instructions to calculate a weighting factor based on the total number of times the file appears with other files that are associated with the failed test further comprises instructions to:
use a dice measure to calculate the weight.

20. The medium of claim 16, wherein the instructions to identify pairs of commits further comprises instructions to:
determine commits are related by using a heuristic.

* * * * *